United States Patent

[11] 3,631,940

[72] Inventor Kenneth A. Richins
    Salt Lake City, Utah
[21] Appl. No. 19,851
[22] Filed Mar. 16, 1970
[45] Patented Jan. 4, 1972
[73] Assignee Eaton Yale & Towne Inc.
    Cleveland, Ohio

[54] LOAD CARRIAGE WITH OPERATOR'S PLATFORM
6 Claims, 6 Drawing Figs.

[52] U.S. Cl. .................................. 182/148, 182/63
[51] Int. Cl. .................................. E04g 1/18
[50] Field of Search .......................... 182/63, 148, 141, 131; 187/9, 95

[56] References Cited
UNITED STATES PATENTS

| | | | |
|---|---|---|---|
| 3,202,242 | 8/1965 | Dolphin | 187/9 |
| 3,263,777 | 8/1966 | Robichon | 187/9 |
| 3,393,768 | 7/1968 | Miller | 182/15 |

*Primary Examiner*—Reinaldo P. Machado
*Attorney*—Teagno & Toddy

ABSTRACT: A load-lifting vehicle has a vertically moving load carriage on which is mounted an operator's platform. When the operator's platform is fully lowered, the load carriage may be in an elevated position from which it may move upwardly to carry the operator's platform therewith, or may move downwardly freely of the operator's platform to a fully lowered position.

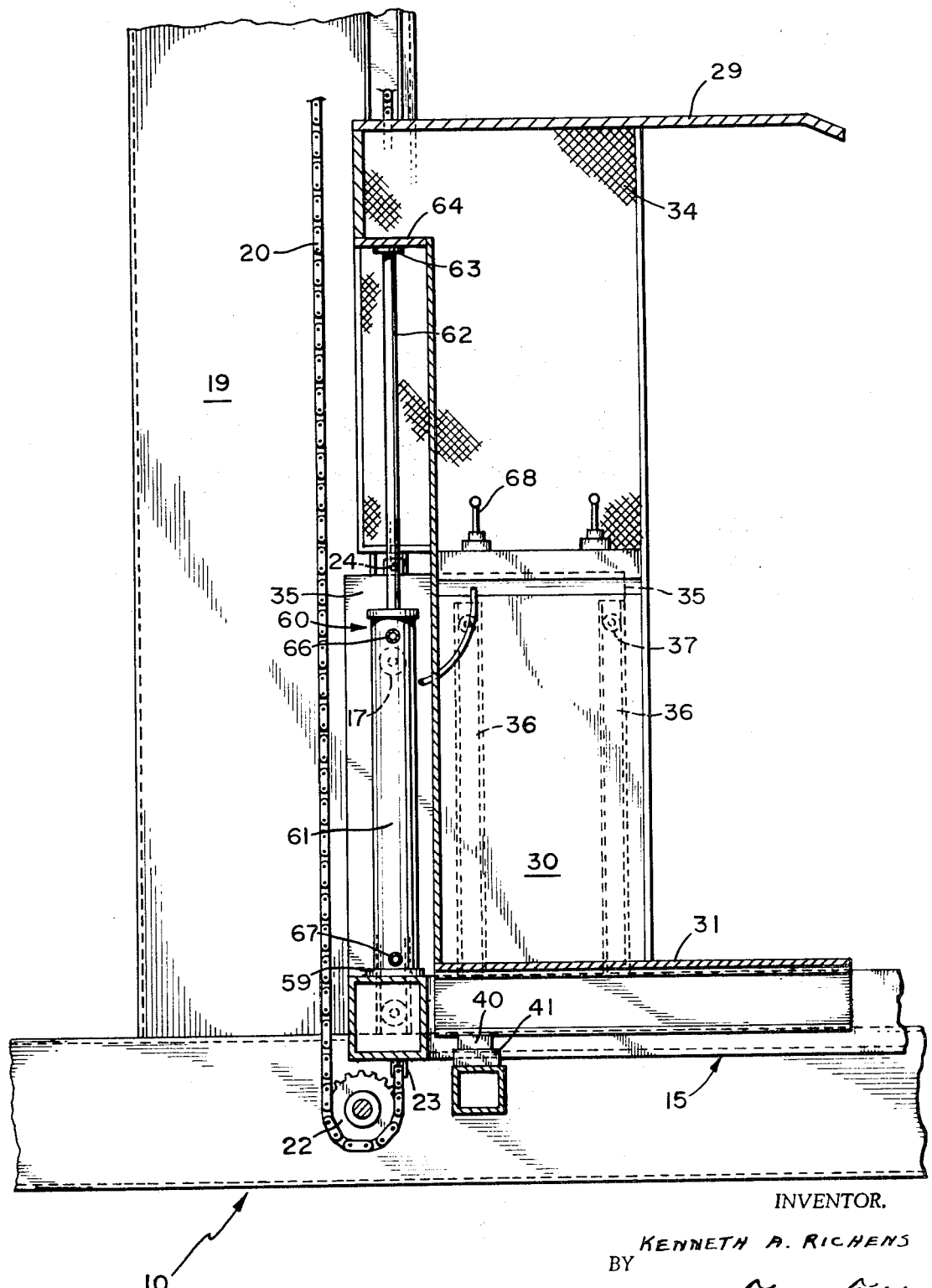

LOAD CARRIAGE WITH OPERATOR'S PLATFORM

FIELD OF INVENTION

This invention relates to a load handling and stacking vehicle of the type adapted to transport and stack a load in an industrial plant or warehouse. More particularly it relates to a vehicle in which the load is elevated by movement of a load carriage on a pair of vertical uprights constituting what the art terms a mast.

BACKGROUND OF INVENTION AND PRIOR ART

Load handling and stacking vehicles of the type to which this invention relates, utilize a platform on which an operator is stationed, the platform in some cases moving bodily with the load carriage and the load. In other cases, the operator's platform is fixed relatively to the main frame or mast on which the carriage moves, so that the load is actually lifted and lowered relatively to the operatotor's platform. It is obvious that if the platform on which the operator is positioned, moves with the load, it becomes rather simple for the operator to control the manipulation of the load. On the other hand, the load carriage becomes naturally more cumbersome and complicated, and its movement may be restricted. Thus where the operator's platform moves with the load carriage it is impossible to elevate the carriage as closely to the ceiling of the warehouse as might otherwise be possible because the head room required by the operator's platform is considerable.

Where the load moves relatively to the operator's platform, the load carriage is naturally less complex, and the head room required is at a minimum. However, the operator may be so far below or above the load, that he is not able to position or manipulate the load as efficiently as when he is moving with the load. The combination disclosed in this application makes possible the movement of the operator's platform with the load carriage and the load, while at the same time, through control of the load platform, reduces to a minimum the loss of head room that normally follows from the movement of the operator with the load carriage.

OUTLINE OF INVENTION

A feature of the invention herein disclosed, resides in the mounting of the operator's platform for movement relatively to the load carriage, so that upon lifting of the load carriage, the operator's platform is lowered relatively to the load carriage to decrease the head room required. As a particular feature of the invention, the normal relation of the load carriage and the operator's platform is restored during lowering movement of the carriage, so as to bring the operator's platform into a relatively raised or normal relation with respect to the load carriage.

As a particular feature of the invention, the operator's platform is merely mounted for vertical movement through gravity relatively to the load carriage, and by providing simple abutment means, the raising of the elevating platform will, through the abutment means, raise the operator's platform after a certain limited amount of relative movement or lost motion between the load carriage and operator's platform occurs. What is provided, in effect, is a lost motion connection. Naturally, it is inherent in this lost motion connection that when the load carriage is lowered, it first causes the operator's platform to move into its fully lowered position, after which the load carriage and the load are moved downwardly relatively to the operator's platform to the lowermost position of the load carriage.

As a detailed feature of the invention, means such as hydraulic rams may be applied between the load carriage and the operator's platform, so that in various vertical positions of the load carriage, the operator's platform may be adjusted relatively thereto. Actually, the rams may also be utilized for determining the relative positions of the load carriage and the operator's platform as the carriage moves. Thus, with the piston and the cylinder of each hydraulic ram locked as by a valve preventing flow of fluid in the cylinder, the carriage and the operator's platform must naturally move together. If, at any point, the flow of fluid between the piston and the cylinder of each hydraulic ram is permitted, then, obviously, the load carriage may move relatively to the operator's platform to the degree allowed by the lengths of the ram cylinders.

As a more particular feature of the invention, it is even possible to raise the operator's platform by the carriage through the intermediary of power means present between the platform and the carriage.

Further features of the invention reside in controls for the rams and operating means, as will appear upon a reading of the specification that follows.

DESCRIPTION OF THE DRAWINGS

FIG. 6 is a view taken substantially along line 6—6 of FIG. 4.

DESCRIPTION OF THE INVENTION

Figure 1:
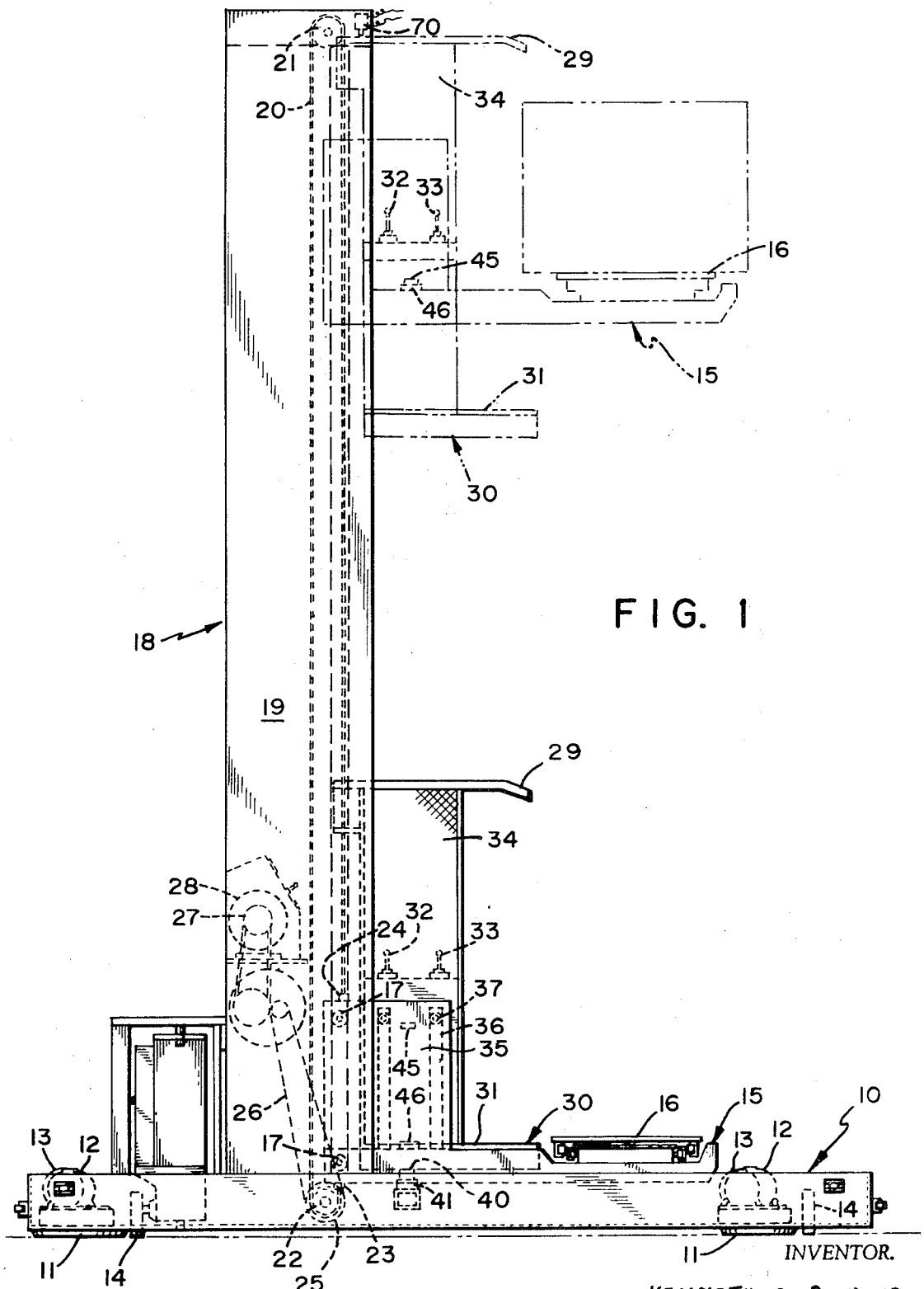
FIG. 1 is a vertical view of the invention showing the operator's platform and the load carriage in a lowered position, and also in an upper or elevated position with the operator's platform lowered relatively to the load carriage.
Figure 2:
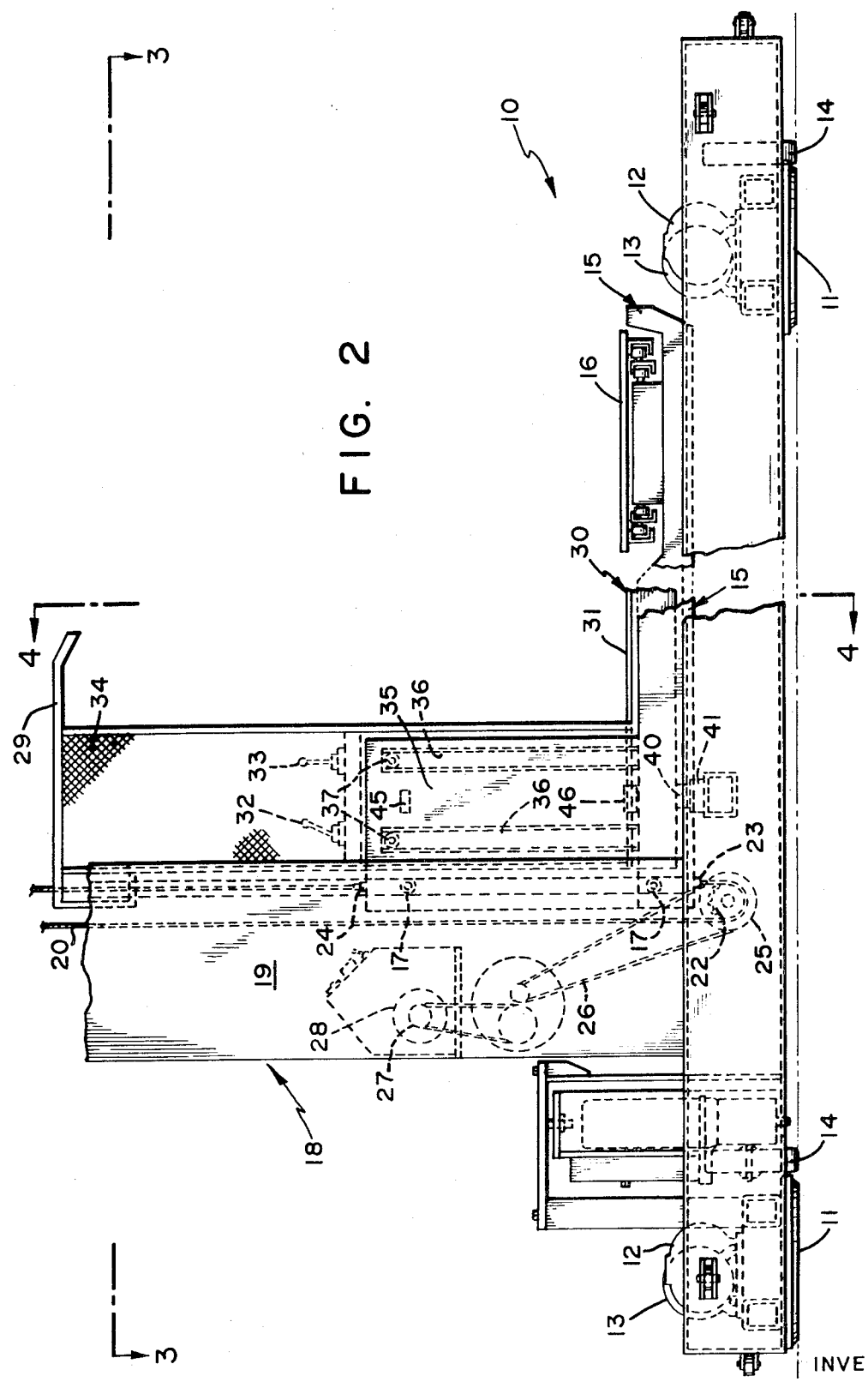
FIG. 2 is an enlarged showing of part of FIG. 1 with details added thereto.
Figure 3:
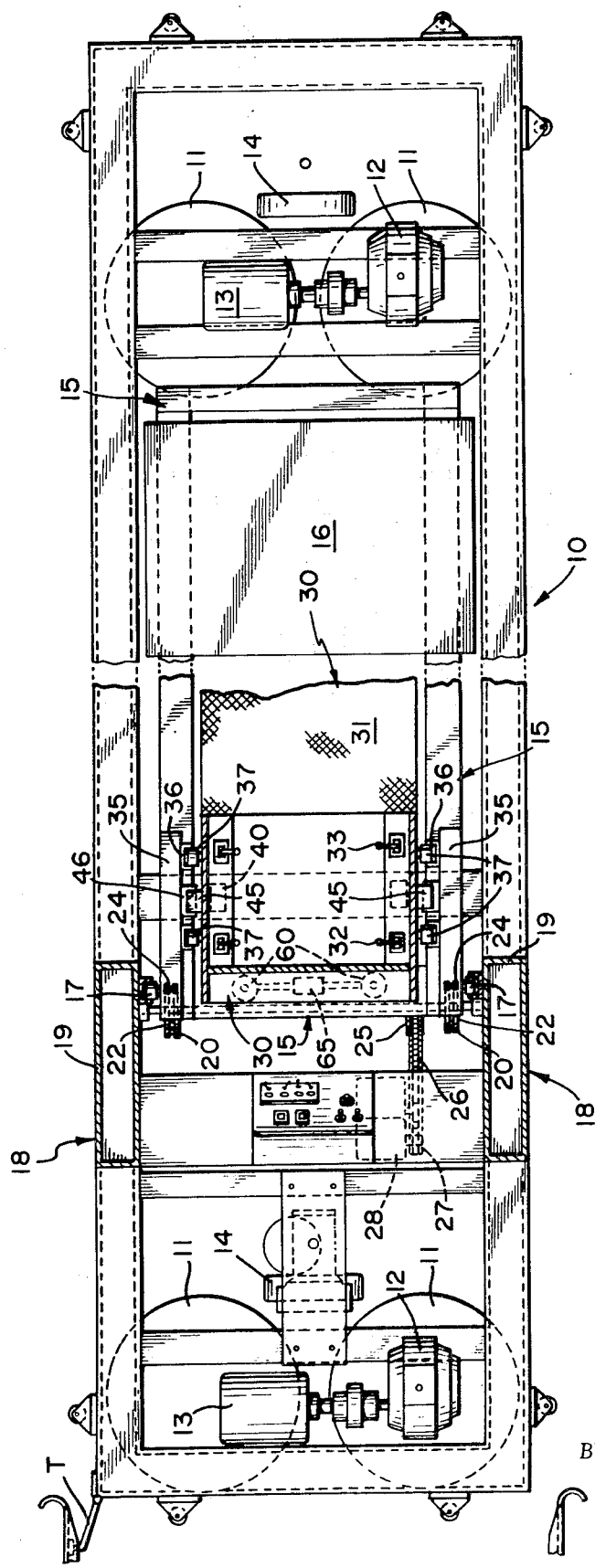
FIG. 3 is a view of FIG. 2 taken along line 3—3 of FIG. 2.

Referring first to FIGS. 1, 2 and 3, the vehicle in which the invention is embodied is of that type illustrated in an earlier application owned by the assignee of this application, Ser. No. 886,884, filed Dec. 22, 1969. This vehicle, designated generally by the numeral 10, as of a type that is adapted to be elevated from the floor of a warehouse by a series of air cushion elements or pads 11 that receive measured amounts of air from fans 12 actuated by motors 13. Generally there will be four of the air cushion elements 11, two near each end of the vehicle. The steering and traction of the vehicle is contributed by a powered wheel 14, which is adapted to be rotated so as to contribute both steering and traction as is set forth in the said earlier application. The motors 13 and additional motors for the driving and traction wheel and the other mechanisms required in this invention all receive their power through a trolley type of contact device T as is shown diagrammatically in FIG. 3. It will, of course, be appreciated that the structure of this patent application may be utilized in many different types of vehicle.

The load carriage of the vehicle is designated generally by reference numeral 15, and is equipped with a horizontally sliding load platform 16, as probably best illustrated in FIG. 2, on which a load may be deposited as shown in the upper portion of FIG. 1. Through a series of upper and lower rollers 17, load carriage 15 may be mounted for vertical movement on a mast assembly 18 formed by a pair of vertically extending uprights 19 shown in section in FIG. 3. It will be obvious to those skilled in the art that the particular form of the load carriage 15, the load platform 16, and the mounting of the carriage on the uprights 19 of the mast assembly 18 are generally conventional.

For moving the load carriage 15 on the vertical uprights 19, any conventional means may be utilized. For the particular purposes of this invention a sprocket chain 20 is reaved over an upper sprocket 21 and a lower sprocket 22. As best illustrated in FIG. 2, one end of the chain 20 is secured at 23 to the bottom of load carriage 15, the other end of the chain being secured at 24 to another portion of the load carriage 15. It is obvious that movement of the chain about the upper and lower sprockets 21 and 22 will bring about the vertical movement of the load carriage 15 on the uprights 19 of the mast 18. To bring about this movement, the sprocket 22 is rotated by a second sprocket 25 that, in turn, is rotated by chain 26 as best seen in FIGS. 1 and 2. The chain 26 is actuated through intermediate sprockets and chains by a motor driven sprocket 27 driven by an electric motor 28. Obviously, by controlling the operation of the electric motor 28, the driving movement of the chain 20 is controlled, so as to lift and lower the load carriage 15 as may be required.

The operator's platform of the vehicle is designated generally by reference numeral 30, and it may comprise an actual platform 31 on which the operator stands, in order to manipulate a pair of controls 32 and 33, together with such additional controls as may be required. The operator standing on the platform 31 will be shielded by a grating such as designated by reference numeral 34 in FIG. 2, and also by an upper canopy 29 as is common in the art. It is obvious that the distance between the canopy 29 and the platform portion 31 of the operator's platform 30, determines the head room that is required by the vehicle to protect the operator. Thus, it is obvious that the operator's platform cannot be raised beyond a position where the canopy 29 is brought up against the ceiling of a warehouse in which the vehicle operates. Were the operator's platform 30 to be integral with the load carriage 15, the canopy 29 would determine the uppermost position of the load to be lifted by the load carriage 15.

In accordance with the features of the invention earlier outlined, the load carriage 15, as is probably best seen in FIGS. 2–5 inclusive, is formed with vertical uprights 35 having channels 36 in which are mounted for movement, laterally spaced rollers 37 suitably mounted on the operator's platform 30. Through the rollers 37, the operator's platform 30 may move vertically relatively to the load carriage 15 as determined by the lengths of the channels 36 of the uprights 35.

Figure 4:
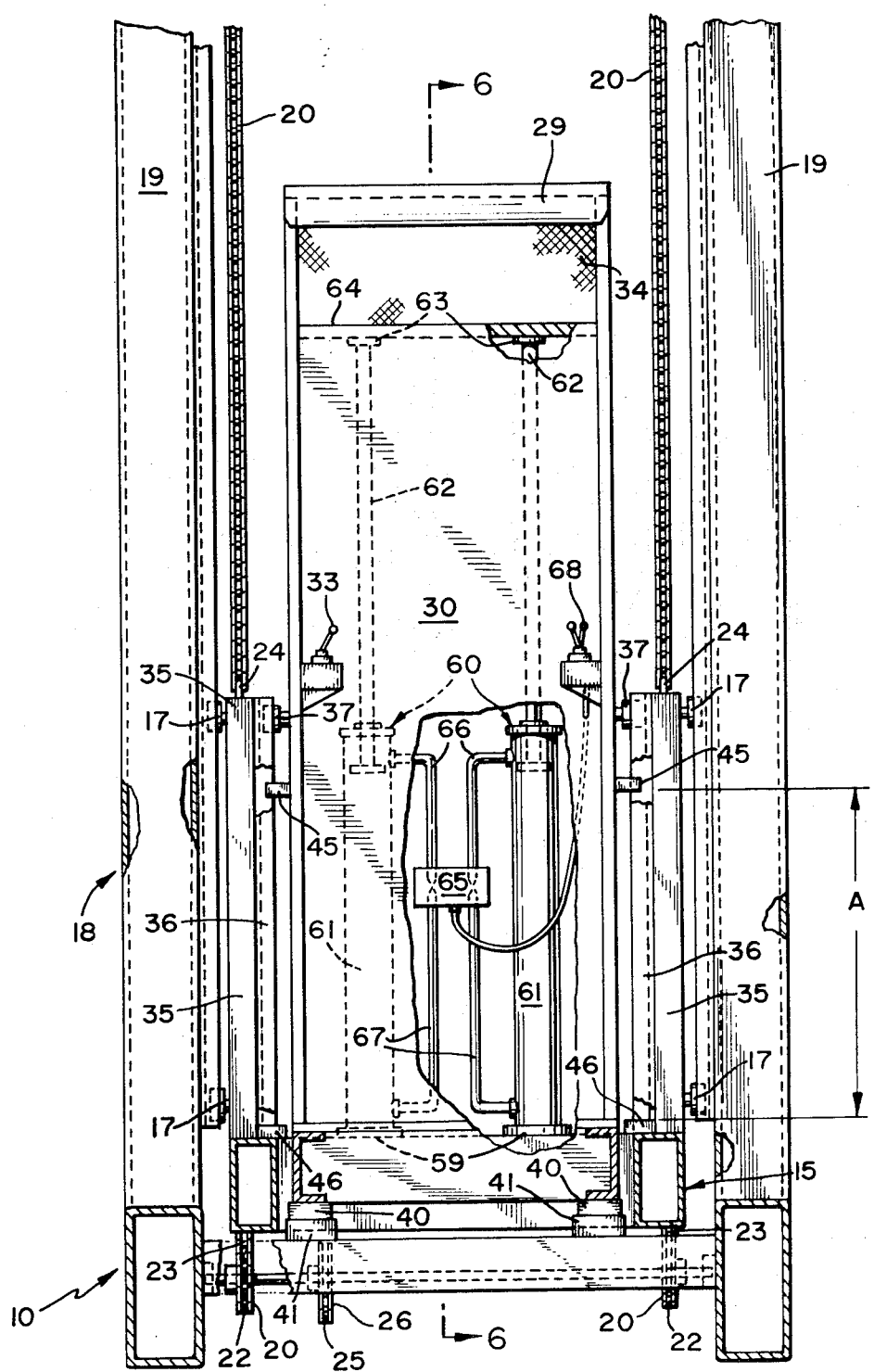
FIG. 4 is a vertical section and elevation along line 4—4 of FIG. 2.

In FIG. 4, the operator's platform 30 is in its fully elevated position relatively to the carriage 15, and in this position of the parts, the operator's platform 30 and load carriage 15 are also in their fully lowered position relatively to the main frame of the vehicle 10. As is probably best seen in FIG. 4, the operator's platform 30 is equipped with a series of bottom stops 40 that are in contact with cooperating stops 41 fixed to the main frame of the vehicle 10. Therefore, it may be stated that in its lowermost position relatively to the vehicle the operator's platform 30 will be stopped by the main frame 10 of the vehicle against further downward motion.

As probably best seen in FIGS. 2 and 4, the operator's platform 30 is equipped with a pair of opposed lugs or abutments 45. The load carriage 15 is equipped with similar lugs or abutments 46. When the load carriage 15 is in its fully lowered position, and the operator's platform 30 also in its fully lowered position of FIGS. 2 and 4, the abutments are separated a vertical distance designated by the letter A in FIG. 4. If, in this position of the parts, the motor 28 is energized so as to move the chain 20 to lift the load carriage 15 from its position of FIG. 4, it is obvious that the operator's platform 30 will at first remain in its position of FIG. 4, resting by gravity on the lugs 41 through coaction with the lugs 40 fixed to the operator's platform. As the elevating load carriage 15 moves upwardly, the abutments 46 will strike the abutments 45 as seen in FIG. 5, so that further upward movement of the load carriage will raise the operator's platform upwardly therewith, bringing the stop lugs 40 away from the stop lugs 41 as also seen in FIG. 5.

Naturally, further upward movement of the carriage 15 will raise the load to the position illustrated in phantom lines in FIG. 1. At the same time, through the coaction of the abutments 45, 46 as illustrated also in the upper part of FIG. 1, the operator's platform 30 will be raised. However, the platform portion 31 on which the operator stands, will be lowered considerably relatively to the load carriage from the position illustrated in FIG. 2 or in solid lines of FIG. 1. As a matter of fact, the distance the operator's platform will be lowered relatively to the load carriage 15 will be the distance set forth at A in FIG. 4. Therefore, the head room required by the vehicle will be reduced by the distance represented by letter A. Thus, although the head room required is reduced considerably, the operator nevertheless moves substantially with the load and the load carriage, so as always to be in a position to manipulate the load and position it effectively relatively to racks, bins or the like. It will be appreciated also, that controls 32 and 33 will always be available to the operator standing on the platform 31 of the operator's platform as best shown in FIG. 1 in phantom, in all the extreme positions of the operator's platform 30 relative to the load carriage 15.

Figure 5:
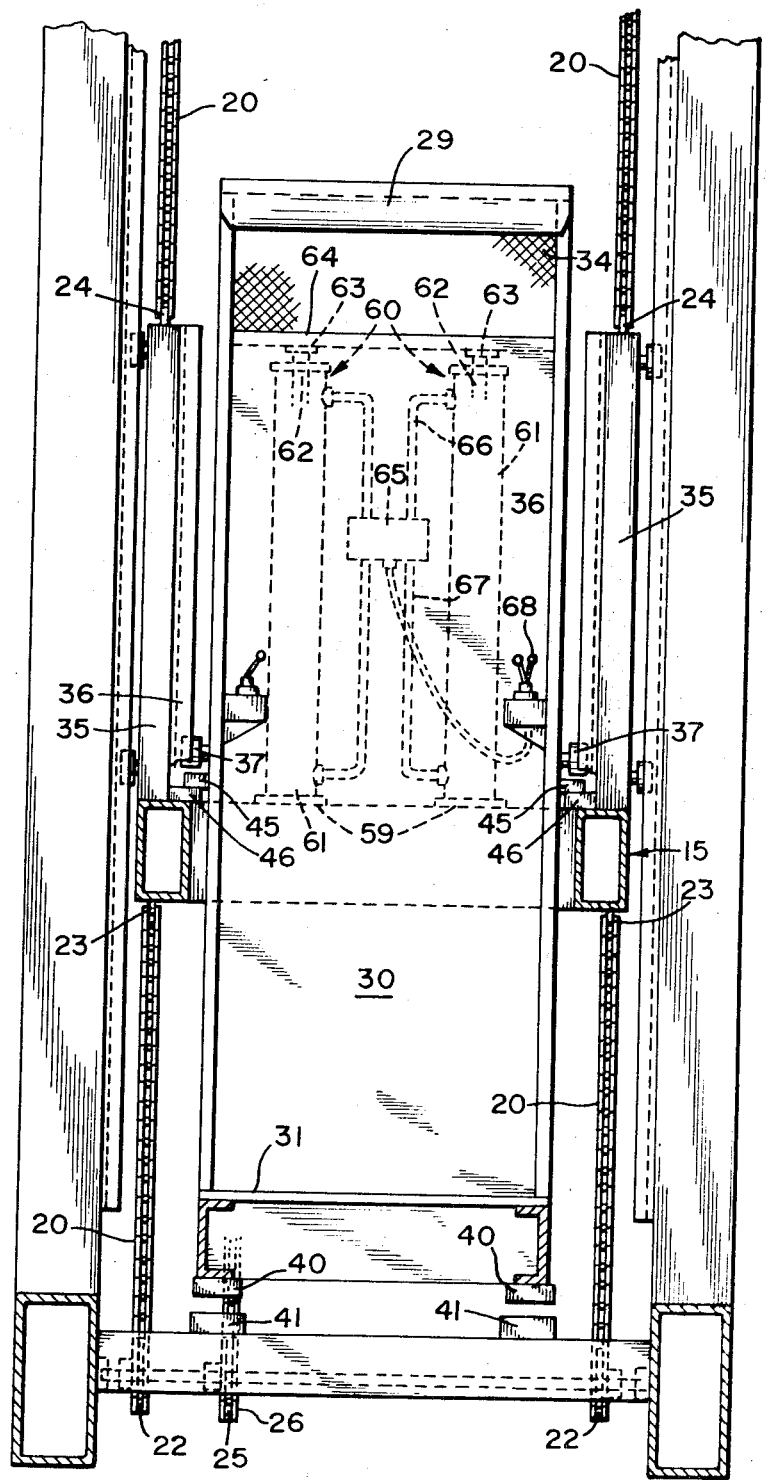
FIG. 5 is a view similar to FIG. 4 but showing the load carriage elevated to a position to raise the operator's platform slightly from its fully lowered position of FIG. 4.

It is, of course, obvious that upon lowering of the load carriage 15 and the operator's platform 30, the operator's platform will first move into a position where its stop abutments 40 will contact the bottom stops 41 of the main frame of the vehicle, this being just after the load carriage and operator's platform move downwardly slightly from the position of FIG. 5. Thereafter, the load carriage 15 will naturally move relatively to the operator's platform 30 back to its fully lowered position of FIGS. 1, 2 and 4.

In order that it may be possible to adjust the position of the operator's platform 30 relatively to the load carriage 15 in certain intermediate positions of the carriage, should such adjustment be necessary, the invention contemplates the use of a pair of hydraulic rams, each designated by reference numeral 60 in the several figures and as probably best illustrated in FIGS. 4, 5 and 6. Each ram 60 comprises a cylinder 61 fixed at its lower end at 59 to the load carriage 15. The piston of each ram 60 is designated by reference numeral 62, and is fixed at its upper end at 63 to a plate 64 integral with the operator's platform 30. An electrically operated valve is designated by reference numeral 65. This valve, through suitable passages 66, 67 directed to each of the cylinders 61, is adapted to control the movement of the piston 62 of each ram 60 in a standard manner.

The valve 65 may be controlled by a hand operated control lever 68 for directing fluid through the valve 65 from a suitable source of fluid pressure, as is also quite standard in the art. Obviously, by moving the piston 62 inwardly of the ram cylinder 61, the operator's platform may be moved relatively to the load carriage within the limits possible through the location of the abutment lugs 45 and 46 and the length of the cylinder 61. Thus, let us imagine that the elevating load carriage 15 is in the position illustrated in phantom in FIG. 1, and that the operator's platform 30 is also positioned as there shown. It is possible, in this position of the parts, to bring about an upward movement of the operator's platform 30 relatively to the load carriage 15, since it is obvious that the abutment lugs 45 can be lifted upwardly relatively to the lower abutment lugs 46 fixed to the load carriage 15 by operation of the rams 60.

AS was indicated earlier, a feature of the invention can be the elimination completely of the abutment lugs 45 and 46, with reliance for control of the vertical position operator's platform 30 relative to the load carriage 15 solely through the two rams 60. Thus, if the two rams 60 are in the condition shown in FIG. 4, with no fluid flowing through the passages from a pressure source to the cylinders 61, and with the valve 65 in a neutral position, the load carriage 15 can move freely upwardly relatively to the operator's platform 30, with the two pistons 62 then moving into the cylinders 61 under the effect of gravity. This will bring about a full movement of the pistons 62 into the ram cylinders 61 as well illustrated in phantom in FIG. 5. Thereafter, the two ram cylinders 61 will simply impart movement through the pistons 62 to the operator's platform 30, and there will be a lifting of the operator's platform 30 through the rams 60 in the same manner as occurs when the lost motion abutment lugs 46, 45 come into contact as shown in FIG. 5. In other words, the two rams 60 may contribute the same lost motion connection as do the lugs 46, 45.

Obviously, when the load carriage is moved downwardly from its position of FIG. 5, the operator's platform will first be deposited in contact with the stops 41 of the main frame of the vehicle. Thereafter, since there is free flow of fluid through the ram cylinders 61, the cylinders will move down freely of the pistons 62 and back to the position of FIG. 4. Naturally, in all positions of the operator's platform in which the pistons 62 are inwardly of the cylinders 61 of each ram 60, there can be an adjustment of the operator's platform relatively to the load carriage.

In order to protect the operator, a suitable limit switch 70 is utilized. This limit switch controls the operation of the lifting motor 28 and stops the operation of this motor and the consequent movement of the load carriage immediately upon the canopy 29 reaching its uppermost position. It also controls operation of the valve 65 so that the operator's platform cannot be raised relatively to the load carriage 15 in a particular position and injure the operator.

It is thought that those skilled in the art will now fully appreciate the operation of the invention and the contribution to the art.

I now claim:

1. In a vehicle of the class described, a main frame including a vertical mast,
   an elevating load carriage,
   means mounting said load carriage for vertical movement along said mast,
   means for moving said carriage vertically on said mounting means relatively to said main frame,
   an operator's platform,
   means mounting said platform for vertical movement on said carriage and also for movement with said carriage,
   a lost motion connection between said platform and carriage whereby said carriage may move freely upwardly of said platform in a vertical direction for a predetermined distance and then moves said platform vertically upwardly therewith,
   said lost motion connection including a hydraulic cylinder and piston located between said carriage and platform for permitting movement of said carriage relatively to said platform to move said piston in opposed directions into and out of said cylinder when the hydraulic fluid is allowed to flow freely into and from said piston and cylinder, and
   control means for inhibiting said flow of fluid whereupon said carriage and platform may be locked for integral movement.

2. In the combination of claim 1, the feature that said control means also directs fluid under pressure into said cylinder whereby to move said platform relatively to said carriage.

3. In a vehicle of the class described, a main frame including a vertical mast,
   an elevating load carriage,
   means mounting said load carriage for vertical movement along said mast,
   means for moving said carriage vertically on said mounting means relatively to said main frame,
   an operator's platform,
   means mounting said platform for vertical movement on said carriage and also for movement with said carriage,
   a lost motion connection between said platform and carriage whereby said carriage may move freely upwardly of said platform in a vertical direction for a predetermined distance and then moves said platform vertically upwardly therewith, and
   a hydraulic ram between said carriage and platform for controlling the position of said platform relatively to said carriage independently of said lost motion means of connection.

4. In a vehicle of the class described, a main frame including a vertical mast,
   an elevating load carriage,
   means mounting said load carriage for vertical movement along said mast,
   means for moving said carriage vertically on said mounting means relatively to said main frame,
   an operator's platform,
   means mounting said platform for vertical movement on said carriage and also for movement with said carriage,
   a lost motion connection between said platform and carriage whereby said carriage may move freely upwardly of said platform in a vertical direction for a predetermined distance and then moves said platform vertically upwardly therewith,
   said lost motion connection comprising abutment means on said carriage adapted to engage abutment means on said platform during upward movement of said carriage, said abutment means on said carriage dropping from contact with the abutment means on said platform to permit said carriage to move downwardly relatively to said platform when said platform reaches a predetermined position with respect to said main frame during downward travel of the carriage and platform, and
   a hydraulic ram between said carriage and platform for controlling the position of said platform relatively to said carriage independently of said abutment means.

5. In a vehicle of the class described, a main frame including a vertical mast,
   an elevating load carriage,
   means mounting said load carriage for vertical movement along said mast,
   means for moving said carriage vertically on said mounting means relatively to said main frame,
   an operator's platform,
   means mounting said platform for vertical movement on said carriage and also for movement with said carriage,
   a lost motion connection between said platform and carriage whereby said carriage may move freely upwardly of said platform in a vertical direction for a predetermined distance and then moves said platform vertically upwardly therewith,
   said lost motion connection comprising abutment means on said carriage adapted to engage abutment means on said platform during upward movement of said carriage, said abutment means on said carriage dropping from contact with the abutment means on said platform to permit said carriage to move downwardly relatively to said platform when said platform reaches a predetermined position with respect to said main frame during downward travel of the carriage and platform, said abutment means being effective to lift said platform with said carriage after engaging said abutment means on the platform, and
   a hydraulic ram between said carriage and platform for controlling the position of said platform relatively to said carriage independently of said abutment means.

6. In a vehicle of the class described, a main frame including a vertical mast,
   an elevating load carriage,
   means mounting said load carriage for vertical movement along said mast,
   means for moving said carriage vertically on said mounting means relatively to said main frame,
   an operator's platform,
   means mounting said platform for vertical movement on said carriage and also for movement with said carriage,
   a lost motion connection between said platform and carriage whereby said carriage may move freely upwardly of said platform in a vertical direction for a predetermined distance and then moves said platform vertically upwardly therewith, and
   means for controlling the position of said platform relatively to said carriage independently of said lost motion means of connection.

* * * * *